United States Patent
Takayasu et al.

(10) Patent No.: US 11,673,810 B2
(45) Date of Patent: Jun. 13, 2023

(54) AEROGEL AND METHOD FOR PRODUCING SAME

(71) Applicant: HITACHI CHEMICAL COMPANY, LTD., Tokyo (JP)

(72) Inventors: Satoshi Takayasu, Tokyo (JP); Tatsuya Makino, Tokyo (JP); Tomohiko Kotake, Tokyo (JP); Hiroyuki Izumi, Tokyo (JP); Kaito Kogure, Tokyo (JP)

(73) Assignee: RESONAC CORPORATION, Tokyo (JP)

(*) Notice: Subject to any disclaimer, the term of this patent is extended or adjusted under 35 U.S.C. 154(b) by 61 days.

(21) Appl. No.: 16/652,766

(22) PCT Filed: Oct. 4, 2017

(86) PCT No.: PCT/JP2017/036165
§ 371 (c)(1),
(2) Date: Apr. 1, 2020

(87) PCT Pub. No.: WO2019/069406
PCT Pub. Date: Apr. 11, 2019

(65) Prior Publication Data
US 2020/0231452 A1  Jul. 23, 2020

(51) Int. Cl.
*C01B 33/158* (2006.01)
*C01B 33/145* (2006.01)
*C01B 33/146* (2006.01)
*C01B 33/155* (2006.01)

(52) U.S. Cl.
CPC ........ *C01B 33/1585* (2013.01); *C01B 33/145* (2013.01); *C01B 33/146* (2013.01); *C01B 33/155* (2013.01)

(58) Field of Classification Search
CPC ... C01B 33/145; C01B 33/146; C01B 33/155; C01B 33/1585
See application file for complete search history.

(56) References Cited

U.S. PATENT DOCUMENTS

| 4,402,927 A | 9/1983 | von Dardel |
| 10,995,184 B2 * | 5/2021 | Iwanaga ............... B01J 13/0021 |

FOREIGN PATENT DOCUMENTS

| CN | 101376501 A | 3/2009 |
| JP | 2000-026609 A | 1/2000 |
| JP | 2011-093744 A | 5/2011 |
| JP | 2012-233110 A | 11/2012 |
| JP | 2013-060309 A | 4/2013 |
| JP | 2013060309 A * | 4/2013 |
| JP | 5250900 B | 7/2013 |
| WO | 2016/178560 A1 | 11/2016 |
| WO | WO-2017164184 A1 * | 9/2017 .......... B01J 13/0021 |

OTHER PUBLICATIONS

Duan et al (Surface Modification and Reinforcement of Silica Aerogels Using Polyhedral Oligomeric Silsesquioxanes, Langmuir, 2012) (Year: 2012).*

* cited by examiner

*Primary Examiner* — Anthony J Zimmer
*Assistant Examiner* — Logan Edward Laclair
(74) *Attorney, Agent, or Firm* — Fitch, Even, Tabin & Flannery, L.L.P.

(57) ABSTRACT

The present invention provides a method for producing an aerogel, comprising a sol generating step of generating, by hydrolyzing a silane oligomer, a sol containing a hydrolysis product of the silane oligomer; a wet gel generating step of obtaining a wet gel by gelation of the sol; and a drying step of drying the wet gel to obtain an aerogel, wherein a proportion of silicon atoms each bonded to three oxygen atoms in a total number of silicon atoms contained in the silane oligomer is 50% or more.

7 Claims, No Drawings

AEROGEL AND METHOD FOR PRODUCING SAME

CROSS-REFERENCE TO RELATED APPLICATIONS

This application is a U.S. national phase application filed under 35 U.S.C. § 371 of International Application No. PCT/JP2017/036165, filed Oct. 4, 2017, designating the United States, which is hereby incorporated herein by reference in its entirety.

TECHNICAL FIELD

The present invention related to an aerogel and a method for producing the same.

BACKGROUND ART

A silica aerogel is known as a material having low thermal conductivity and having a thermal insulation property. The silica aerogel is useful as a functional material having excellent functionality (such as a thermal insulation property), a specific optical characteristic, a specific electric characteristic and the like, and is used in, for example, an electronic substrate material utilizing an ultra-low dielectric constant characteristic of the silica aerogel, a thermal insulating material utilizing a high thermal insulation property of the silica aerogel, a light reflecting material utilizing an ultra-low refractive index of the silica aerogel, and the like.

As a method for producing such a silica aerogel, a supercritical drying method in which a gel compound (alkogel) obtained by hydrolysis of alkoxysilane and polymerization is dried under supercritical conditions of a dispersion medium is known (see, for example, Patent Literature 1). The supercritical drying method is a method in which an alkogel and a dispersion medium (a solvent for use in drying) are introduced into a high pressure vessel, and the dispersion medium is changed into a supercritical fluid by applying a temperature and a pressure equal to or higher than the critical points, so as to remove a solvent contained in the alkogel. Since a high pressure process needs to be performed in the supercritical drying method, however, capital investment to a special apparatus or the like capable of enduring supercritical conditions is needed, and in addition, lots of time and effect are required.

Therefore, a method for drying an alkogel by a generic method not requiring a high pressure process has been proposed. As such a method, for example, a method in which monoalkyl trialkoxysilane and tetraalkoxysilane are used together in a specific ratio as gel raw materials so as to increase the strength of the resultant alkogel, and to dry the alkogel under normal pressure is known (see, for example, Patent Literature 2). When such normal pressure drying is employed, however, the gel tends to shrink due to stress derived from capillary force within the alkogel.

CITATION LIST

Patent Literature

Patent Literature 1: U.S. Pat. No. 4,402,927
Patent Literature 2: Japanese Unexamined Patent Publication No. 2011-93744

SUMMARY OF INVENTION

Technical Problem

In this manner, examinations have been made on the problems of the conventional production processes from a variety of viewpoints, and on the other hand, no matter which of the processes is employed, there is a problem that an aerogel is difficult to be shaped into a prescribed shape. For example, in the above-described process, the shrinkage caused in drying is so large that it is difficult to form an aerogel with the shape before drying retained.

The present invention was devised in consideration of the circumstances described above, and an object is to provide an aerogel that minimally shrinks in volume in drying, and has excellent formability (for example, film formability), and a method for producing the same.

Solution to Problem

The present inventors made earnest studies for achieving the above-described object, resulting in finding that an aerogel can be formed with good formability by a production method using a specific silane oligomer.

The present disclosure provides a method for producing an aerogel, comprising: a sol generating step of generating, by hydrolyzing a silane oligomer, a sol containing a hydrolysis product of the silane oligomer; a wet gel generating step of obtaining a wet gel by gelation of the sol; and a drying step of drying the wet gel to obtain an aerogel, wherein a proportion of silicon atoms each bonded to three oxygen atoms in a total number of silicon atoms contained in the silane oligomer is 50% or more. In this production method, since volume shrinkage caused in the drying step is suppressed, a shape of the wet gel in drying is sufficiently retained, and hence the aerogel can be formed with good formability.

In the production method of the present disclosure, a weight average molecular weight of the silane oligomer may be 200 or more and 10000 or less. Thus, the volume shrinkage caused in the drying step is further suppressed. It is noted that the weight average molecular weight of the silane oligomer herein refers to a weight average molecular weight in terms of standard polystyrene measured by gel permeation chromatography (GPC).

In the production method of the present disclosure, the silane oligomer may have an alkoxy group, and a content of the alkoxy group may be 2% by mass or more and 60% by mass or less with respect to a total amount of the silane oligomer. Thus, the volume shrinkage caused in the drying step is further suppressed.

The present disclosure also provides an aerogel obtained as a dried substance of a wet gel, the wet gel being a condensate of a sol containing a silane oligomer, wherein a proportion of silicon atoms each bonded to three oxygen atoms in a total number of silicon atoms contained in the silane oligomer is 50% or more.

In the aerogel of the present disclosure, a weight average molecular weight of the silane oligomer may be 200 or more and 10000 or less.

In the aerogel of the present disclosure, the silane oligomer may have an alkoxy group, and a content of the alkoxy group may be 2% by mass or more and 60% by mass or less with respect to a total amount of the silane oligomer.

Advantageous Effects of Invention

According to the present invention, an aerogel that minimally shrinks in volume in drying and has excellent formability (for example, film formability) and a method for producing the same are provided.

DESCRIPTION OF EMBODIMENTS

Hereinafter, a preferred embodiment of the present invention will be described. The description will be made in detail. It is noted that the present invention is not limited to the following embodiment. In the present specification, a numerical range described by using "to" refers to a range including numerical values placed before and after "to" respectively as the minimum value and the maximum value. The term "A or B" may include any one of A and B, and may include both. Materials exemplified in the embodiments may be used singly or in combination of two or more unless otherwise specified.

<Method for Producing Aerogel>

A method for producing an aerogel according to the present embodiment includes a sol generating step of generating, by hydrolyzing a silane oligomer, a sol containing a hydrolysis product of the silane oligomer, a wet gel generating step of obtaining a wet gel by gelation of the sol, and a drying step of drying the wet gel to obtain an aerogel. In this production method, a proportion of silicon atoms each bonded to three oxygen atoms in a total number of silicon atoms contained in the silane oligomer is 50% or more.

In this production method, volume shrinkage caused in the drying step is suppressed by using a specific silane oligomer, a shape of the wet gel in drying is sufficiently retained, and hence the aerogel can be formed with good formability. Therefore, according to the above-described production method, an aerogel formed in the shape of, for example, a film can be easily formed.

It is to be noted that a sol refers to a state obtained before occurrence of a gelation reaction, and means, in the present embodiment, a state where a silicon compound containing the hydrolysis product of the silane oligomer is dissolved or dispersed in a liquid medium. Besides, a wet gel means a gel solid in a wet state that contains a liquid medium and does not have flowability.

The method for producing an aerogel according to the present embodiment may further include a washing step of washing (and, if necessary, performing solvent replacement of) the wet gel obtained in the wet gel generating step. When appropriate catalyst and solvent are used in the sol generating step and the wet gel generating step in the present embodiment, such a washing step can be omitted to produce an aerogel. When the washing step is omitted, the process can be simplified and the cost can be reduced.

(Sol Generating Step)

The sol generating step is a step of generating, by hydrolyzing a silane oligomer, a sol containing a hydrolysis product of the silane oligomer.

The silane oligomer is a polymer of a silane monomer, and has a structure in which a plurality of silicon atoms are connected to one another via oxygen atoms. Herein, the silane oligomer refers to a polymer having 2 to 100 silicon atoms in one molecule. The silane oligomer may be, for example, a polymer of one of or two or more of silane monomers described later, and is preferably a polymer of a silane monomer containing alkyltrialkoxysilane.

The silicon atoms contained in the silane oligomer can be classified into a silicon atom bonded to one oxygen atom (M-unit), a silicon atom bonded to two oxygen atoms (D-unit), a silicon atom bonded to three oxygen atoms (T-unit) and a silicon atom bonded to four oxygen atoms (Q-unit). Examples of the M-unit, the D-unit, the T-unit and the Q-unit respectively include the following formulas (M), (D), (T) and (Q).

[Chemical Formula 1]

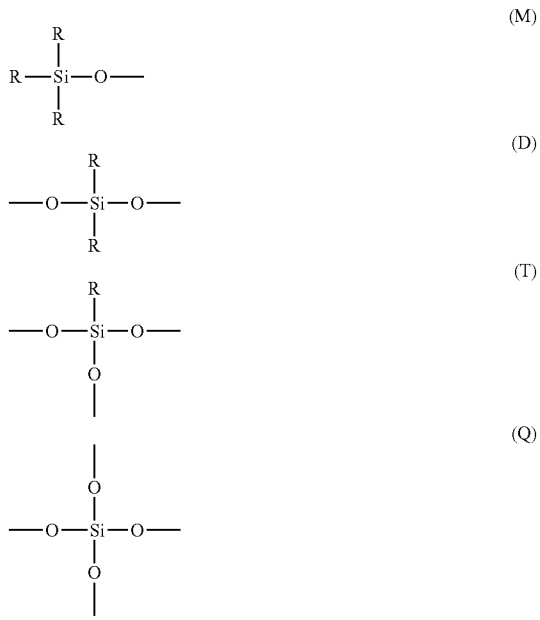

In the formulas, R represents an atom (such as a hydrogen atom) excluding an oxygen atom bonded to silicon or an atomic group (such as an alkyl group). Information on contents of these units can be obtained by Si-NMR.

In the silane oligomer, the proportion of the T-unit in the total number of silicon atoms is 50% or more, preferably 60% or more, more preferably 70% or more, and may be 100%.

The silane oligomer preferably has, as R in the formulas (M), (D), (T) and (Q), an alkyl group or an aryl group.

An example of the alkyl group includes an alkyl group having 1 to 6 carbon atoms. Specific examples of the alkyl group include a methyl group, an ethyl group, a propyl group and a butyl group, and among these, a methyl group and an ethyl group are preferred, and a methyl group is more preferred.

Examples of the aryl group include a phenyl group and a substituted phenyl group. Examples of a substituent of the substituted phenyl group include an alkyl group, a vinyl group, a mercapto group, an amino group, a nitro group and a cyano group. As the aryl group, a phenyl group is preferred.

The silane oligomer has a hydrolyzable functional group, and it is presumed that the hydrolyzable functional group is hydrolyzed to generate a silanol group in the sol generating step. An example of the hydrolyzable functional group includes an alkoxy group. Specific examples of the alkoxy group include a methoxy group, an ethoxy group and a propoxy group, and from the viewpoint of a reaction speed of the hydrolysis reaction, a methyl group and an ethoxy group are preferred.

A content of the hydrolyzable functional group may be, with respect to a total amount of the silane oligomer, for example, 2% by mass or more, and is preferably 10% by mass or more, and more preferably 20% by mass or more.

Besides, the content of the hydrolyzable functional group may be, with respect to the total amount of the silane oligomer, for example, 60% by mass or less, and is preferably 50% by mass or less, and more preferably 45% by mass or less. When such a silane oligomer is used, the volume shrinkage caused in the drying step can be further suppressed, and an aerogel more excellent in the formability is obtained.

A weight average molecular weight of the silane oligomer may be, for example, 200 or more, and is preferably 400 or more, and more preferably 600 or more. Besides, the weight average molecular weight of the silane oligomer may be, for example, 10000 or less, and is preferably 7000 or less, and more preferably 5000 or less. When such a silane oligomer is used, the volume shrinkage caused in the drying step can be further suppressed, and an aerogel more excellent in the formability is obtained. It is noted that the weight average molecular weight of the silane oligomer herein refers to a weight average molecular weight in terms of standard polystyrene measured by gel permeation chromatography (GPC).

As the silane oligomer, a commercially available product may be used, and examples include XR31-B1410 and XC-96-B0446 (both manufactured by Momentive), KR-500, KR-515, X-40-9225 and KC-89S (all manufactured by Shin-Etsu Chemical Co., Ltd.), and SR-2402 and AY42-163 (both manufactured by Toray Dow Corning Silicone Co., Ltd.).

In the sol generating step, an additional silicon compound different from the silane oligomer may be additionally hydrolyzed. An example of the additional silicon compound includes a silane monomer having a hydrolyzable functional group or a condensable functional group. Examples of the hydrolyzable functional group are the same as those described above as the examples of the hydrolyzable functional group of the silane oligomer. An example of the condensable functional group includes a silanol group. It can be said that the silane monomer is a silicon compound not having a siloxane bond (Si—O—Si).

Examples of a silane monomer having a hydrolyzable functional group include monoalkyl trialkoxysilane, monoaryl trialkoxysilane, monoalkyl dialkoxysilane, monoaryl dialkoxysilane, dialkyl dialkoxysilane, diaryl dialkoxysilane, monoalkyl monoalkoxysilane, monoaryl monoalkoxysilane, dialkyl monoalkoxysilane, diaryl monoalkoxysilane, trialkyl monoalkoxysilane, triaryl monoalkoxysilane and tetraalkoxysilane. Specific examples include methyl trimethoxysilane, methyl triethoxysilane, phenyl trimethoxysilane, phenyl triethoxysilane, methyl dimethoxysilane, dimethyl diethoxysilane, dimethyl dimethoxysilane, ethyl trimethoxysilane, hexyl trimethoxysilane and tetraethoxysilane.

Examples of a silane monomer having a condensable functional group include silanetetraol, methylsilanetriol, dimethylsilanediol, phenylsilanetriol, phenylmethylsilanediol, diphenylsilanediol, n-propylsilanetriol, hexylsilanetriol, octylsilanetriol, decylsilanetriol and trifluoropropylsilanetriol.

The silane monomer may further contain the reactive group different from the hydrolyzable functional group and the condensable functional group. Examples of the reactive group include an epoxy group, a mercapto group, a glycidoxy group, a vinyl group, an acryloyl group, a methacryloyl group and an amino group. The epoxy group may be contained in an epoxy group-containing group such as a glycidoxy group.

Examples of a silane monomer having a hydrolyzable functional group and a reactive group include vinyltrimethoxysilane, 3-glycidoxypropyltrimethoxysilane, 3-glycidoxypropylmethyldimethoxysilane, 3-methacryloxypropyltrimethoxysilane, 3-methacryloxypropylmethyldimethoxysilane, 3-acryloxypropyltrimethoxysilane, 3-mercaptopropyltrimethoxysilane, 3-mercaptopropylmethyldimethoxysilane, N-phenyl-3-aminopropyltrimethoxysilane, N-2-(aminoethyl)-3-aminopropylmethyldimethoxysilane or the like.

Examples of a silane monomer having a condensable functional group and a reactive group include vinylsilanetriol, 3-glycidoxypropylsilanetriol, 3-glycidoxypropylmethylsilanediol, 3-methacryloxypropylsilanetriol, 3-methacryloxypropylmethylsilanediol, 3-acryloxypropylsilanetriol, 3-mercaptopropylsilanetriol, 3-mercaptopropylmethylsilanediol, N-phenyl-3-aminopropylsilanetriol, N-2-(aminoethyl)-3-aminopropylmethylsilanediol or the like.

Besides, the silane monomer may have two or more silicon atoms, and examples of such a silane monomer include bistrimethoxysilylmethane, bistrimethoxysilylethane and bistrimethoxysilylhexane.

An example of the additional silicon compound includes a polysiloxane compound (in which the proportion of the T-unit is less than 50% or the number of silicon atoms exceeds 100) having a hydrolyzable reactive group or a condensable functional group. Examples of the hydrolyzable reactive group and the condensable functional group include the same groups as those described above.

Among the above polysiloxane compounds, an example of the polysiloxane compound having a hydroxyalkyl group includes one having a structure represented by the following formula (A). When the polysiloxane compound having the structure represented by the following formula (A) is used, the structure represented by the formula (1) and the formula (1a) described later can be introduced into a skeleton of an aerogel.

[Chemical Formula 2]

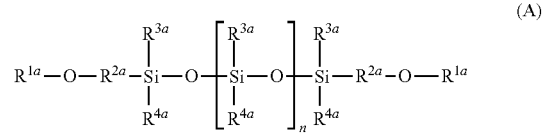

(A)

In the formula (A), $R^{1a}$ represents a hydroxyalkyl group, $R^{2a}$ represents an alkylene group, $R^{3a}$ and $R^{4a}$ each independently represent an alkyl group or an aryl group, and n represents an integer of 1 to 50. Here, examples of the aryl group include a phenyl group and a substituted phenyl group. Examples of a substituent of the substituted phenyl group include an alkyl group, a vinyl group, a mercapto group, an amino group, a nitro group and a cyano group. In the formula (A), two $R^{1a}$ may be the same or different, and similarly, two $R^{2a}$ may be the same or different. In the formula (A), two or more $R^{3a}$ may be the same or different, and similarly, two or more $R^{4a}$ may be the same or different.

$R^{1a}$ in the formula (A) can be a hydroxyalkyl group having 1 to 6 carbon atoms or the like, and examples of the hydroxyalkyl group include a hydroxyethyl group and a hydroxypropyl group. Besides, $R^{2a}$ in the formula (A) can be an alkylene group having 1 to 6 carbon atoms or the like, and examples of the alkylene group include an ethylene group and a propylene group. Furthermore, $R^{3a}$ and $R^{4a}$ in the formula (A) can each independently be an alkyl group having 1 to 6 carbon atoms, a phenyl group or the like, and an example of the alkyl group includes a methyl group. Besides, n in the formula (A) can be 2 to 30, and may be 5 to 20.

As the polysiloxane compound having the structure represented by the above formula (A), a commercially available product can be used, and examples include compounds such as X-22-160AS, KF-6001, KF-6002 and KF-6003 (all manufactured by Shin-Etsu Chemical Co., Ltd.) and compounds such as XF42-B0970 and Fluid OFOH 702-4% (both manufactured by Momentive).

Among the above described polysiloxane compounds, an example of a polysiloxane compound having an alkoxy group includes one having a structure represented by the following formula (B). When the polysiloxane compound having the structure represented by the following formula (B) is used, the ladder-type structure including the bridges represented by the formula (2) or (3) described later can be introduced into a skeleton of an aerogel.

[Chemical Formula 3]

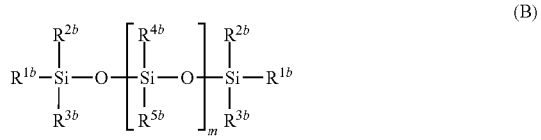

(B)

In the formula (B), $R^{1b}$ represents an alkyl group, an alkoxy group or an aryl group, $R^{2b}$ and $R^{3b}$ each independently represent an alkoxy group, $R^{4b}$ and $R^{5b}$ each independently represent an alkyl group or an aryl group, and m represents an integer of 1 to 50. Here, examples of the aryl group include a phenyl group and a substituted phenyl group. Examples of a substituent of the substituted phenyl group include an alkyl group, a vinyl group, a mercapto group, an amino group, a nitro group and a cyano group. In the formula (B), two $R^{1b}$ may be the same or different, two $R^{2b}$ may be the same or different, and similarly, two $R^{3b}$ may be the same or different. Besides, when m is an integer of 2 or more in the formula (B), two or more $R^{4b}$ may be the same or different, and similarly, two or more $R^{5b}$ may be the same or different.

$R^{1b}$ in the formula (B) can be an alkyl group having 1 to 6 carbon atoms, an alkoxy group having 1 to 6 carbon atoms or the like, and examples of the alkyl group or the alkoxy group include a methyl group, a methoxy group and an ethoxy group. Besides, $R^{2b}$ and $R^{3b}$ in the formula (B) can each independently be an alkoxy group having 1 to 6 carbon atoms or the like, and examples of the alkoxy group include a methoxy group and an ethoxy group. Furthermore, $R^{4b}$ and $R^{5b}$ in the formula (B) can each independently be an alkyl group having 1 to 6 carbon atoms, a phenyl group or the like, and an example of the alkyl group includes a methyl group. Besides, m in the formula (B) can be 2 to 30, and may be 5 to 20.

The polysiloxane compound having the structure represented by the above formula (B) can be obtained by appropriately referring to production methods reported in Japanese Unexamined Patent Publication No. 2000-26609 and Japanese Unexamined Patent Publication No. 2012-233110.

Besides, as the polysiloxane compound having an alkoxy group, a silicate oligomer such as a methyl silicate oligomer or an ethyl silicate oligomer can be also used. Examples of such a silicate oligomer include Methyl Silicate 51, Methyl Silicate 53A, Ethyl Silicate 40 and Ethyl Silicate 48 (all manufactured by Colcoat Co., Ltd.)

Furthermore, since an alkoxy group hydrolyzes, there is a possibility that the polysiloxane compound having an alkoxy group is present in a sol as a hydrolysis product, and hence, the polysiloxane compound having an alkoxy group and the hydrolysis product thereof may be present as a mixture. Besides, in the polysiloxane compound having an alkoxy group, all the alkoxy groups in molecules may be hydrolyzed, or may be partially hydrolyzed.

In the silicon compound to be hydrolyzed in the sol generating step, a proportion of the silane oligomer described above may be, for example, 5% by mass or more, and is preferably 10% by mass or more, and more preferably 20% by mass or more.

When the silane monomer described above is further used as the silicon compound in the sol generating step, an amount of the silane monomer may be, with respect to 100 parts by mass of the silane oligomer, 2000 parts by mass or less, and is preferably 1000 parts by mass or less, and more preferably 5000 parts by mass or less. Besides, the amount of the silane monomer may be, with respect to 100 parts by mass of the silane oligomer, for example, 1 part by mass or more, and is preferably 10 parts by mass or more, and more preferably 50 parts by mass or more. When the silane monomer is used in such an amount, the flexibility and toughness of the resultant aerogel are improved, and the volume shrinkage caused in the drying step tends to be further easily suppressed.

When the polysiloxane compound described above is further used as the silicon compound in the sol generating step, an amount of the polysiloxane compound may be, with reference to 100 parts by mass of the silane oligomer, 100 parts by mass or less, and is preferably 50 parts by mass or less, and more preferably 25 parts by mass or less. The addition of the polysiloxane compound may improve the flexibility and the toughness of the resultant aerogel in some cases.

In the sol generating step, for example, the silicon compound containing the silane oligomer can be hydrolyzed in a solvent. As the solvent, for example, water or a mixed solvent containing water and alcohol can be used. Examples of the alcohol include methanol, ethanol, n-propanol, 2-propanol, n-butanol, 2-butanol and t-butanol. Among these, from the viewpoint of reducing surface tension against a gel wall, methanol, ethanol and 2-propanol that are alcohols having low surface tension and having a low boiling point are suitable. Single one of these, or a mixture of two or more of these may be used.

From the viewpoint of omitting the washing step, a mixed solvent containing water and alcohol is preferred as the solvent. At this point, a mixing ratio between water and alcohol is not especially limited, and a volume ratio of alcohol to water (alcohol/water) may be, for example, 1 or more, and is preferably 1.5 or more, and more preferably 2 or more. Besides, the volume ratio may be, for example, 100 or less, and is preferably 50 or less, and more preferably 10 or less.

Besides, a solvent having low surface tension may be further added to the mixed solvent. A solvent having low surface tension can be one having surface tension at 20° C. of 30 mN/m or less. It is noted that the surface tension may be 25 mN/m or less, or 20 mN/m or less. Examples of the solvent having low surface tension include aliphatic hydrocarbons such as pentane (15.5), hexane (18.4), heptane (20.2), octane (21.7), 2-methylpentane (17.4), 3-methylpentane (18.1), 2-methylhexane (19.3), cyclopentane (22.6), cyclohexane (25.2) and 1-pentene (16.0); aromatic hydrocarbons such as benzene (28.9), toluene (28.5), m-xylene (28.7) and p-xylene (28.3); halogenated hydrocarbons such as dichloromethane (27.9), chloroform (27.2), carbon tetrachloride (26.9), 1-chloropropane (21.8) and 2-chloropropane (18.1); ethers such as ethyl ether (17.1), propyl ether (20.5), isopropyl ether (17.7), butyl ethyl ether (20.8) and 1,2-dimethoxyethane (24.6); ketones such as acetone (23.3), methyl ethyl ketone (24.6), methyl propyl ketone (25.1) and diethyl ketone (25.3); and esters such as methyl acetate (24.8), ethyl acetate (23.8), propyl acetate (24.3), isopropyl acetate (21.2), isobutyl acetate (23.7) and ethyl butylate (24.6) (bracketed values indicating surface tension at 20° C. in unit of [mN/m]). Among these, the aliphatic hydrocarbons (such as hexane and heptane) not only have low surface tension but also are excellent in working environment properties. Single one of, or a mixture of two or more of these solvents may be used.

In the sol generating step, an acid catalyst may be further added to the solvent for accelerating the hydrolysis reaction.

Examples of the acid catalyst include inorganic acids such as hydrofluoric acid, hydrochloric acid, nitric acid, sulfuric acid, sulfurous acid, phosphoric acid, phosphorous acid, hypophosphoric acid, bromic acid, chloric acid, chlorous acid and hypochlorous acid; acidic phosphates such as acidic aluminum phosphate, acidic magnesium phosphate and acidic zinc phosphate; and organic carboxylic acids such as acetic acid, formic acid, propionic acid, oxalic acid, malonic acid, succinic acid, citric acid, malic acid, adipic acid and azelaic acid. Among these, an acid catalyst more improving the water resistance of a resultant aerogel can be an organic carboxylic acid. The organic carboxylic acid can be acetic acid, and may be formic acid, propionic acid, oxalic acid, malonic acid or the like. Besides, from the viewpoint of omitting the washing step, acetic acid, formic acid or the like is preferably used as the acid catalyst.

An amount of the acid catalyst added is not especially limited, and can be, for example, 0.001 to 10 parts by mass with respect to 100 parts by mass of the total amount of the silicon compound.

In the sol generating step, as described in Japanese Patent No. 5250900, a surfactant, a thermally hydrolyzable compound or the like can be added to the solvent. From the viewpoint of omitting the washing step, however, it is preferable that a surfactant and a thermally hydrolyzable compound are not added.

As the surfactant, a nonionic surfactant, an ionic surfactant and the like can be used. These may be used singly, or used as a mixture of two or more thereof.

As the nonionic surfactant, for example, a compound including a hydrophilic moiety such as polyoxyethylene and a hydrophobic moiety having mainly an alkyl group, a compound including a hydrophilic moiety such as polyoxypropylene, or the like can be used. Examples of the compound including a hydrophilic moiety such as polyoxyethylene and a hydrophobic moiety having mainly an alkyl group include polyoxyethylene nonylphenyl ether, polyoxyethylene octylphenyl ether and polyoxyethylene alkyl ether. Examples of the compound including a hydrophilic moiety such as polyoxypropylene include polyoxypropylene alkyl ether, and a block copolymer of polyoxyethylene and polyoxypropylene.

Examples of the ionic surfactant include a cationic surfactant, an anionic surfactant, and an amphoteric surfactant. Examples of the cationic surfactant include cetyltrimethylammonium bromide and cetyltrimethylammonium chloride, and an example of the anionic surfactant includes sodium dodecylsulfonate. Besides, examples of the amphoteric surfactant include an amino acid-based surfactant, a betaine-based surfactant and an amine oxide-based surfactant. An example of the amino acid-based surfactant includes acylglutamic acid. Examples of the betaine-based surfactant include lauryl dimethylamino acetic acid betaine and stearyl dimethylamino acetic acid betaine. An example of the amine oxide-based surfactant includes lauryldimethylamine oxide.

It is regarded that such a surfactant has a function, in the wet gel generating step described below, to reduce a difference in chemical affinity between the solvent used in the reaction system and a siloxane polymer growing therein to inhibit phase separation. When the mixed solvent containing water and alcohol is used as the solvent in the present embodiment, the alcohol seems to provide a similar effect to the above-described effect of the surfactant, and hence, a wet gel can be suitably generated without adding a surfactant.

It is regarded that the thermally hydrolyzable compound generates a base catalyst through thermal hydrolysis to make the reaction solution basic, and accelerates a sol-gel reaction in the wet gel generating step described below. Therefore, the thermally hydrolyzable compound is not particularly limited as long as it is a compound capable of making the reaction solution basic after the hydrolysis, and examples include urea; acid amides such as formamide, N-methylformamide, N,N-dimethylformamide, acetamide, N-methylacetamide and N,N-dimethylacetamide; and a cyclic nitrogen compound such as hexamethylenetetramine. Among these, the acceleration effect described above is more easily obtained particularly by urea.

In the sol generating step, for purposes of inhibiting heat ray radiation and the like, a component such as carbon graphite, an aluminum compound, a magnesium compound, a silver compound or a titanium compound may be added to the solvent. Besides, in the sol generating step, a silica particle described later may be added to the solvent.

Although the hydrolysis performed in the sol generating step varies depending on the types and the amounts of the silicon compound, the acid catalyst and the like contained in a mixture, the hydrolysis may be performed, for example, under a temperature environment of 20 to 80° C. for 10 minutes to 24 hours, or may be performed under a temperature environment of 50 to 60° C. for 5 minutes to 8 hours. Thus, the hydrolyzable functional group contained in the silicon compound is sufficiently hydrolyzed, and hence the hydrolysis product of the silicon compound can be more definitely obtained.

It is noted that, when the thermally hydrolyzable compound is added to the solvent, the temperature environment in the sol generating step may be adjusted to a temperature at which the hydrolysis of the thermally hydrolyzable compound is inhibited to inhibit gelation of the sol. The temperature at this point may be any temperature as long as the hydrolysis of the thermally hydrolyzable compound can be inhibited. When, for example, urea is used as the thermally hydrolyzable compound, the temperature environment in the sol generating step can be 0 to 40° C., and may be 10 to 30° C.

In the sol generating step, the silicon compound containing the silane oligomer is hydrolyzed to generate a sol containing a hydrolysis product of the silicon compound. It can be said that the hydrolysis product is a product resulting from hydrolysis of a part or the whole of a hydrolyzable functional group contained in the silicon compound.

(Wet Gel Generating Step)

The wet gel generating step is a step of obtaining a wet gel by gelation of the gel obtained in the sol generating step. This step may be a step of obtaining a wet gel by gelation of the sol, and then aging the resultant. In this step, a base catalyst for accelerating the gelation can be used.

Examples of the base catalyst include carbonates such as calcium carbonate, potassium carbonate, sodium carbonate, barium carbonate, magnesium carbonate, lithium carbonate, ammonium carbonate, copper (II) carbonate, iron (II) carbonate and silver (I) carbonate; bicarbonates such as calcium bicarbonate, potassium bicarbonate, sodium bicarbonate and ammonium bicarbonate; alkali metal hydroxides such as lithium hydroxide, sodium hydroxide, potassium hydroxide and cesium hydroxide; ammonium compounds such as ammonium hydroxide, ammonium fluoride, ammonium chloride and ammonium bromide; basic sodium phosphates such as sodium metaphosphate, sodium pyrophosphate and sodium polyphosphate; aliphatic amines such as allylamine, diallylamine, triallylamine, isopropylamine, diisopropylamine, ethylamine, diethylamine, triethylamine, 2-ethylhexylamine, 3-ethoxypropylamine, diisobutylamine, 3-(diethylamino)propylamine, di-2-ethylhexylamine, 3-(dibutylamino)propylamine, tetramethylethylenediamine, t-butylamine, sec-butylamine, propylamine, 3-(methylamino)propylamine, 3-(dimethylamino)propylamine, 3-methoxyamine, dimethylethanolamine, methyldiethanolamine, diethanolamine and triethanolamine; and nitrogen-containing heterocyclic compounds such as morpholine, N-methylmorpholine, 2-methylmorpholine and piperazine and a derivative thereof, piperidine and a derivative thereof, and imidazole and a derivative thereof. Among these, ammonium hydroxide (ammonium water) is excellent in a point that it has high volatility and hence minimally remains in an aerogel particle after drying, and therefore minimally impairs the water resistance, and further in an economic point. Besides, from the viewpoint of omitting the washing step, the basic catalyst is preferably ammonium hydroxide (ammonia water). The above base catalysts may be used singly, or used as a mixture of two or more thereof.

When the base catalyst is used, a dehydration condensation reaction or a dealcoholization condensation reaction of the silicon compound contained in the sol can be accelerated, and hence the gelation of the sol can be performed in a shorter period of time. Besides, thus, a wet gel having high strength (rigidity) can be obtained. In particular, since ammonia has high volatility and hence minimally remains in an aerogel particle, when ammonium hydroxide is used as the base catalyst, an aerogel more excellent in the water resistance can be obtained.

An amount of the basic catalyst added can be, with respect to 100 parts by mass of the total amount of the silicon compound used in the sol generating step, 0.1 to 10 parts by mass, and may be 1 to 4 parts by mass. When it is 0.1 parts by mass or more, the gelation can be performed in a shorter period of time, and when it is 10 parts by mass or less, the degradation of the water resistance can be further inhibited.

The gelation of the sol in the wet gel generating step may be performed in a sealed vessel so as not to volatilize the solvent and the base catalyst. A gelation temperature can be 30 to 90° C., and may be 40 to 80° C. When the gelation temperature is 30° C. or more, the gelation can be performed in a shorter period of time, and a wet gel having higher strength (rigidity) can be obtained. Besides, when the gelation temperature is 90° C. or less, volatilization of the solvent (alcohol in particular) is easily inhibited, and hence the gelation can be performed with volume shrinkage suppressed.

The aging in the wet gel generating step may be performed in a sealed vessel so as not to volatilize the solvent and the base catalyst. The aging strengthens a bond between the components of a wet gel, and as a result, a wet gel having strength (rigidity) sufficiently high for inhibiting the shrinkage in drying can be obtained. An aging temperature can be 30 to 90° C., and may be 40 to 80° C. When the aging temperature is 30° C. or more, a wet gel having higher strength (rigidity) can be obtained, and when the aging temperature is 90° C. or less, the volatilization of the solvent (alcohol in particular) is easily inhibited, and hence the gelation can be performed with the volume shrinkage suppressed.

Furthermore, since it is difficult to determine an end point of the gelation of a sol in many cases, the gelation of the sol and the subsequent aging may be performed continuously through a series of operations.

A gelation time and an aging time can be appropriately set in accordance with the gelation temperature and the aging temperature. The gelation time can be 10 to 120 minutes, and may be 20 to 90 minutes. When the gelation time is 10 minutes or more, a more homogeneous wet gel is easily obtained, and when it is 120 minutes or less, procedures from the washing step to the drying step described below can be simplified. Furthermore, a total time of the gelation time and the aging time in the whole gelation and aging process can be 4 to 480 hours, and may be 6 to 120 hours. When the sum of the gelation time and the aging time is 4 hours or more, a wet gel having higher strength (rigidity) can be obtained, and when it is 480 hours or less, the effect of the aging is more easily retained.

In order to decrease the density or increase an average pore size of a resultant aerogel particle, the gelation temperature and the aging temperature may be increased within the above range, or the total time of the gelation time and the aging time may be elongated within the above range. Besides, in order to decrease the density or increase the average pore size of a resultant aerogel, the gelation temperature and the aging temperature may be decreased within the above range, or the total time of the gelation time and the aging time may be shortened within the above range.

(Washing Step)

The washing step is a step of washing the wet gel obtained in the wet gel generating step. In the washing step, solvent replacement for replacing a washing liquid contained in the wet gel with a solvent suitable for drying conditions (in the drying step described below) may be further performed.

In the washing step, the wet gel obtained through the wet gel generating step is washed. The washing can be repeatedly performed using, for example, water or an organic solvent. At this point, washing efficiency can be improved by heating.

As the organic solvent, various organic solvents such as methanol, ethanol, 1-propanol, 2-propanol, 1-butanol, acetone, methyl ethyl ketone, 1,2-dimethoxyethane, acetonitrile, hexane, toluene, diethyl ether, chloroform, ethyl acetate, tetrahydrofuran, methylene chloride, N,N-dimethylformamide, dimethylsulfoxide, acetic acid and formic acid can be used. The above organic solvents may be used singly, or used as a mixture of two or more thereof.

In the solvent replacing, a solvent having low surface tension can be used for inhibiting the shrinkage of the gel caused by drying. A solvent having low surface tension has, however, very low mutual solubility with water in general.

Therefore, when a solvent having low surface tension is used in the solvent replacing, the organic solvent used in the washing can be a hydrophilic organic solvent having high mutual solubility with both water and a solvent having low surface tension. Furthermore, the hydrophilic organic solvent used in the washing can play a role of preliminary replacement for the solvent replacing. Among the above organic solvents, the hydrophilic organic solvent can be methanol, ethanol, 2-propanol, acetone, methyl ethyl ketone or the like. Furthermore, methanol, ethanol, methyl ethyl ketone and the like are economically superior.

An amount of the water or the organic solvent used in the washing can be an amount sufficient for replacing the solvent contained in the wet gel and for washing. The amount can be 3 to 10 times as much as the volume of the wet gel.

A temperature environment in the washing can be set to a temperature equal to or lower than the boiling point of the solvent used for the washing, and for example, when methanol is used, heating to about 30 to 60° C. is employed.

In the solvent replacing, the solvent contained in the washed wet gel is replaced with a prescribed replacement solvent in order to inhibit the shrinkage of the aerogel in the drying step. At this point, replacing efficiency can be improved by heating. The replacement solvent can be specifically a solvent having low surface tension described below when the drying is performed in the drying step under atmospheric pressure at a temperature lower than a critical point of a solvent used in the drying. On the other hand, when supercritical drying is employed, examples of the replacement solvent include ethanol, methanol, 2-propanol, dichlorodifluoromethane, carbon dioxide and a mixed solvent of two or more thereof.

The solvent having low surface tension can be a solvent having surface tension at 20° C. of 30 mN/m or less. Furthermore, the surface tension may be 25 mN/m or less, or may be 20 mN/m or less. Examples of the solvent having low surface tension include aliphatic hydrocarbons such as pentane (15.5), hexane (18.4), heptane (20.2), octane (21.7), 2-methylpentane (17.4), 3-methylpentane (18.1), 2-methylhexane (19.3), cyclopentane (22.6), cyclohexane (25.2) and 1-pentene (16.0); aromatic hydrocarbons such as benzene (28.9), toluene (28.5), m-xylene (28.7) and p-xylene (28.3); halogenated hydrocarbons such as dichloromethane (27.9), chloroform (27.2), carbon tetrachloride (26.9), 1-chloropropane (21.8) and 2-chloropropane (18.1); ethers such as ethyl ether (17.1), propyl ether (20.5), isopropyl ether (17.7), butyl ethyl ether (20.8) and 1,2-dimethoxyethane (24.6); ketones such as acetone (23.3), methyl ethyl ketone (24.6), methyl propyl ketone (25.1) and diethyl ketone (25.3); and esters such as methyl acetate (24.8), ethyl acetate (23.8), propyl acetate (24.3), isopropyl acetate (21.2), isobutyl acetate (23.7) and ethyl butylate (24.6) (bracketed values indicating surface tension at 20° C. in unit of [mN/m]). Among these, the aliphatic hydrocarbons (such as hexane and heptane) not only have low surface tension but also are excellent in working environment properties. Besides, when a hydrophilic organic solvent such as acetone, methyl ethyl ketone or 1,2-dimethoxyethane among these is used, the solvent can be used also as the organic solvent in washing. Furthermore, among these, a solvent having a boiling point under normal pressure of 100° C. or less may be used from the viewpoint that the drying is easily performed in the drying step described below. One of these solvents may be used singly, or used as a mixture of two or more thereof.

An amount of the solvent used in the solvent replacing can be an amount with which the solvent contained in the wet gel after the washing can be sufficiently replaced. The amount can be 3 to 10 times as much as the volume of the wet gel.

A temperature environment in the solvent replacing can be set to a temperature equal to or lower than the boiling point of the solvent used for the replacement, and for example, when heptane is used, heating to about 30 to 60° C. is employed.

In the present embodiment, for example, when an organic carboxylic acid selected from the group consisting of acetic acid, formic acid and propionic acid is selected as the acid catalyst, a mixed solvent containing water and alcohol (for example, methanol, ethanol, 2-propanol, n-propanol, t-butanol or the like) is selected as the solvent, and ammonium hydroxide is selected as the basic catalyst, the washing step can be omitted. When the washing step is omitted, for example, the solvent contained in the wet gel generated in the wet gel generating step is removed in the drying step, and thus, the aerogel is produced.

(Drying Step)

In the drying step, the wet gel (having been subjected to the washing step if necessary) is dried, and thus, the aerogel can be obtained. Specifically, an aerogel prepared by drying the wet gel generated from the above sol can be obtained.

A drying method is not particularly limited, and known methods of normal pressure drying, supercritical drying or freeze drying can be employed. Among these, from the viewpoint that an aerogel having low density is easily produced, the freeze drying or the supercritical drying can be employed. Alternatively, from the viewpoint that it can be produced at low cost, the normal pressure drying can be employed. Furthermore, in the present embodiment, normal pressure means 0.1 MPa (atmospheric pressure).

The aerogel can be obtained by drying the wet gel at a temperature lower than a critical point of the solvent contained in the wet gel under atmospheric pressure. A drying temperature varies depending upon the type of the solvent in the wet gel, and can be 20 to 180° C. in consideration that an evaporation rate of the solvent can be increased particularly by drying at a high temperature to cause a large crack in a gel in some cases. Furthermore, the drying temperature may be 60 to 120° C. Besides, a drying time varies depending upon the volume of the wet gel and the drying temperature, and can be 4 to 120 hours. Furthermore, the normal pressure drying encompasses that the drying is rapidly performed by applying a pressure lower than a critical point as long as the productivity is not impaired.

The aerogel can be obtained also by subjecting, to the critical drying, the wet gel. The supercritical drying can be performed by a known method. A method for performing the supercritical drying can be, for example, a method in which the solvent is removed at a temperature and a pressure equal to or higher than the critical points of the solvent contained in the wet gel. Alternatively, the method for performing the critical drying can be a method in which the wet gel is immersed in liquefied carbon dioxide under conditions of, for example, 20 to 25° C. and about 5 to 20 MPa to replace the whole or a part of the solvent contained in the wet gel with carbon dioxide having a lower critical point than the solvent, and then the carbon dioxide is removed singly or a mixture of the carbon dioxide and the solvent is removed.

The aerogel thus obtained by the normal pressure drying or the supercritical drying may be further additionally dried under normal pressure at 105 to 200° C. for about 0.5 to 2 hours. Thus, an aerogel having low density and including a small pore can be more easily obtained. The additional drying may be performed under normal pressure at 150 to 200° C.

In the production method according to the present embodiment, the drying step may be performed after shaping the wet gel into a desired shape. For example, when the wet gel is crushed with a mixer or the like before performing the drying step, a granular aerogel can be obtained. The production method according to the present embodiment may further include a step of shaping the aerogel obtained in the drying step. For example, when the aerogel obtained in the drying step is crushed, a granular aerogel can be obtained.

<Aerogel>

The aerogel according to the present embodiment is a dried substance of a wet gel, the wet gel being a condensate of a sol containing a silane oligomer. The aerogel according to the present embodiment may be one obtained by, for example, the above-described production method.

In a narrow sense, a dry gel obtained from a wet gel by a supercritical drying method is designated as an aerogel, a dry gel obtained by drying under atmospheric pressure is designated as a xerogel, and a dry gel obtained by freeze-drying is designated as a cryogel, but in the present embodiment, a dry gel having low density obtained by any of these methods for drying a wet gel is designated as an "aerogel". In other words, in the present embodiment, the term "aerogel" means an aerogel in a broad sense, namely, "gel comprised of a microporous solid in which the dispersed phase is a gas". In general, an aerogel has a network microstructure inside, and has a cluster structure in which particulate aerogel components of about 2 to 20 nm are bonded to one another. There is a pore smaller than 100 nm between skeletons formed by the cluster. Therefore, three-dimensional microporous structure is formed in an aerogel. Furthermore, an aerogel of the present embodiment is, for example, a silica aerogel containing silica as a main component. An example of the silica aerogel includes a so-called organic-inorganic hybridized silica aerogel into which an organic group (such as a methyl group) or an organic chain has been introduced.

As the aerogel according to the present embodiment, the following aspects can be mentioned. When these aspects are employed, an aerogel excellent in thermal insulation, flame retardance, heat resistance and flexibility is easily obtained. When each of these aspects is employed, aerogels having thermal insulation, flame retardance, heat resistance and flexibility corresponding to the respective aspects can be obtained.

(First Aspect)

The aerogel according to the present embodiment may have a structure represented by the following formula (1). The aerogel according to the present embodiment may have a structure represented by the following formula (1a) as a structure including the structure represented by the formula (1).

[Chemical Formula 4]

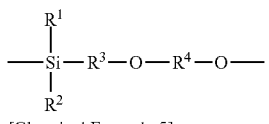

(1)

[Chemical Formula 5]

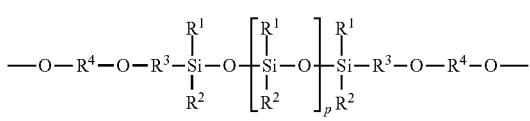

(1a)

In the formula (1) and the formula (1a), $R^1$ and $R^2$ each independently represent an alkyl group or an aryl group, and $R^3$ and $R^4$ each independently represent an alkylene group. Here, examples of the aryl group include a phenyl group and a substituted phenyl group. Examples of a substituent of the substituted phenyl group include an alkyl group, a vinyl group, a mercapto group, an amino group, a nitro group and a cyano group. p represents an integer of 1 to 50. In the formula (1a), two or more $R^1$ may be the same or different, and similarly, two or more $R^2$ may be the same or different. In the formula (1a), two $R^3$ may be the same or different, and similarly, two $R^4$ may be the same or different.

When the structure represented by the above formula (1) or the formula (1a) is introduced into a skeleton of an aerogel as an aerogel component, an aerogel having low thermal conductivity and having flexibility is obtained. From this point of view, in the formula (1) and the formula (1a), $R^1$ and $R^2$ can each independently be an alkyl group having 1 to 6 carbon atoms, a phenyl group or the like, and examples of such an alkyl group include a methyl group. Besides, in the formula (1) and the formula (1a), $R^3$ and $R^4$ can each independently be an alkylene group having 1 to 6 carbon atoms or the like, and examples of such an alkylene group include an ethylene group and a propylene group. In the formula (1a), p can be 2 to 30, and may be 5 to 20.

(Second Aspect)

The aerogel according to the present embodiment may have a ladder-type structure including struts and bridges, and the bridges may have a structure represented by the following formula (2). When such a ladder-type structure is introduced into a skeleton of an aerogel as an aerogel component, heat resistance and mechanical strength can be improved. In the present embodiment, the term "ladder-type structure" refers to a structure including two struts and bridges connecting the struts to each other (a structure in the shape of a so-called "ladder"). In this aspect, the skeleton of the aerogel may have the ladder-type structure, or the aerogel may partially have the ladder-type structure.

[Chemical Formula 6]

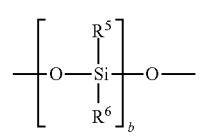

(2)

In the formula (2), $R^5$ and $R^6$ each independently represent an alkyl group or an aryl group, and b represents an integer of 1 to 50. Here, examples of the aryl group include a phenyl group and a substituted phenyl group. Examples of a substituent of the substituted phenyl group include an alkyl group, a vinyl group, a mercapto group, an amino group, a nitro group and a cyano group. When b is an integer of 2 or more in the formula (2), two or more $R^5$ may be the same or different, and similarly, two or more $R^6$ may be the same or different.

When the above structure is introduced into a skeleton of an aerogel as an aerogel component, the resultant is an aerogel more excellent in flexibility than, for example, a conventional aerogel having a structure derived from ladder-type silsesquioxane (namely, having a structure represented by the following formula (X)). Silsesquioxane is polysiloxane having a composition formula: $(RSiO_{1.5})_n$, and may have various skeleton structures including cage-type, ladder-type and random-type structures. Although the structure of the bridge is —O— in the conventional aerogel having the structure derived from the ladder-type silsesquioxane as represented by the following formula (X), the structure of the bridge is the structure represented by the above formula (2) (polysiloxane structure) in the aerogel according to the present embodiment. It should be noted that the aerogel of this aspect may further include a structure derived from silsesquioxane in addition to the structure represented by the formula (2).

[Chemical Formula 7]

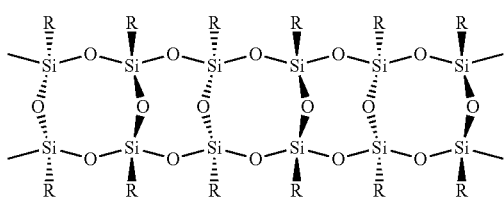

(X)

In the formula (X), R represents a hydroxy group, an alkyl group or an aryl group.

The structure and the chain length of the struts and the interval between the structures of the bridges are not particularly limited, and from the viewpoint that the heat resistance and the mechanical strength are further improved, a ladder-type structure represented by the following formula (3) may be employed as the ladder-type structure.

[Chemical Formula 8]

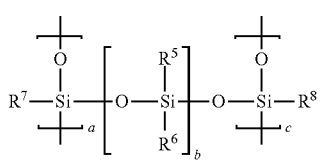

(3)

In the formula (3), $R^5$, $R^6$, $R^7$ and $R^8$ each independently represent an alkyl group or an aryl group, a and c each independently represent an integer of 1 to 3000, and b represents an integer of 1 to 50. Here, examples of the aryl group include a phenyl group and a substituted phenyl group. Examples of a substituent of the substituted phenyl group include an alkyl group, a vinyl group, a mercapto group, an amino group, a nitro group and a cyano group. When b is an integer of 2 or more in the formula (3), two or more $R^5$ may be the same or different, and similarly, two or more $R^6$ may be the same or different. When a is an integer of 2 or more in the formula (3), two or more $R^7$ may be the same or different, and similarly, when c is an integer of 2 or more, two or more $R^8$ may be the same or different.

Furthermore, from the viewpoint of obtaining more excellent flexibility, $R^5$, $R^6$, $R^7$ and $R^8$ in the formulas (2) and (3) (wherein $R^7$ and $R^8$ are used only in the formula (3)) can each independently be an alkyl group having 1 to 6 carbon atoms, a phenyl group or the like, and an example of the alkyl group includes a methyl group. Besides, in the formula (3), a and c can each independently be 6 to 2000, and may be 10 to 1000. Furthermore, in the formulas (2) and (3), b can be 2 to 30, and may be 5 to 20.

(Third Aspect)

From the viewpoint of further toughening and achieving further excellent thermal insulation and flexibility, the aerogel according to the present embodiment may further contain a silica particle in addition to the aerogel component. An aerogel containing the aerogel component and the silica particle can be designated as an aerogel complex. The aerogel complex contains the aerogel component and the silica particle complexed to each other and has a cluster structure that is a characteristic of an aerogel, and probably has a three-dimensional microporous structure.

It can be said that the aerogel containing the aerogel component and the silica particle is a dried substance of a wet gel, the wet gel being a condensate of a sol containing the hydrolysis product of the silicon compound containing the silane oligomer, and the silica particle. Accordingly, the description of the first to third aspects can be appropriately applied to the aerogel according to the present aspect.

Any silica particle can be used without limit, and an example includes an amorphous silica particle. Examples of the amorphous silica particle include a fused silica particle, a fumed silica particle and a colloidal silica particle. Among these, a colloidal silica particle has high monodispersity, and is easily inhibited from aggregating in a sol. Furthermore, the silica particle may be a silica particle having a hollow structure, a porous structure or the like.

The shape of the silica particle is not particularly limited, and examples include a spherical shape, a cocoon shape and an associated shape. Among these, when a particle in a spherical shape is used as a silica particle, the aggregation in a sol is easily inhibited. An average primary particle size of the silica particle may be 1 nm or more, may be 5 nm or more, or may be 20 nm or more from the viewpoints that appropriate strength and flexibility can be easily imparted to an aerogel and that an aerogel excellent in shrinkage resistance in drying is easily obtained. The average primary particle size of the silica particle may be 500 nm or less, may be 300 nm or less, or may be 100 nm or less from the viewpoints that the solid heat conduction of the silica particle can be easily inhibited, and that an aerogel excellent in thermal insulation is easily obtained. From these points of view, the average primary particle size of the silica particle may be 1 to 500 nm, may be 5 to 300 nm, or may be 20 to 100 nm.

In the present embodiment, the average particle size of the aerogel component and the average primary particle size of the silica particle can be obtained by directly observing the aerogel with a scanning electron microscope (hereinafter abbreviated as "SEM"). The term "diameter" herein means a diameter obtained assuming that a cross section of a particle exposed on a cross section of the aerogel is a circle. Besides, the term "diameter obtained assuming that the cross section is a circle" refers to a diameter of a perfect circle having the same area as the cross section. Furthermore, for calculating the average particle size, diameters of circles with respect to 100 particles are obtained to calculate an average thereof.

Furthermore, the average particle size of the silica particle may be measured based on a raw material. For example, a biaxial average primary particle size is calculated based on results of observation of arbitrary 20 particles with a SEM as follows. Regarding, for example, a colloidal silica particle dispersed in water usually at a solid content concentration of about 5 to 40% by mass, a chip obtained by cutting a wafer having a wiring pattern thereon into a 2 cm square is immersed in a dispersion of the colloidal silica particle for about 30 seconds, and the resultant chip is rinsed with pure water for about 30 seconds and dried by nitrogen blowing. Thereafter, the chip is placed on a sample table for SEM observation, and under an acceleration voltage of 10 kV, the silica particles are observed at 100000 magnification to take an image. In the thus obtained image, 20 silica particles are arbitrarily selected, and an average of particle sizes of these particles is defined as the average particle size.

The number of silanol groups per 1 g of the silica particle may be $10 \times 10^{18}$/g or more, may be $50 \times 10^{18}$/g or more, or may be $100 \times 10^{18}$/g or more from the viewpoint that an aerogel excellent in shrinkage resistance is easily obtained. The number of silanol groups per 1 g of the silica particle may be $1000 \times 10^{18}$/g or less, may be $800 \times 10^{18}$/g or less, or may be $700 \times 10^{18}$/g or less from the viewpoint that a homogenous aerogel is easily obtained. From these points of view, the number of silanol groups per 1 g of the silica particle may be $10 \times 10^{18}$ to $1000 \times 10^{18}$/g, may be $50 \times 10^{18}$ to $800 \times 10^{18}$/g, or may be $100 \times 10^{18}$ to $700 \times 10^{18}$/g.

A content of the silicon compound contained in the above sol may be 5 parts by mass or more, or may be 10 parts by mass or more with respect to 100 parts mass of the total amount of the sol from the viewpoint that good reactivity is more easily obtained. The content of the silicon compound contained in the above sol may be 50 parts by mass or less, or may be 30 parts by mass or less with respect to 100 parts by mass of the total amount of the sol from the viewpoint that good compatibility is more easily obtained. From these points of view, the content of the silicon compound contained in the above sol may be 5 to 50 parts by mass, or may be 10 to 30 parts by mass with respect to 100 parts by mass of the total amount of the sol.

When the above sol contains the silica particle, a content of the silica particle may be 1 part by mass or more, or may be 4 parts by mass or more with respect to 100 parts by mass of the total amount of the sol from the viewpoints that appropriate strength is easily imparted to an aerogel and that an aerogel excellent in the shrinkage resistance in drying is easily obtained. The content of the silica particle may be 20 parts by mass or less, or may be 15 parts by mass or less with respect to 100 parts by mass of the total amount of the sol from the viewpoints that the solid heat conduction of the silica particle is easily inhibited and that an aerogel excellent in thermal insulation is easily obtained. From these points of view, the content of the silica particle may be 1 to 20 parts by mass, or may be 4 to 15 parts by mass with respect to 100 parts by mass of the total amount of the sol.

The preferred embodiment of the present invention has been described so far, and it is noted that the present invention is not limited to the embodiment.

EXAMPLES

Now, the present invention will be more specifically described with reference to examples, and it is noted that the present invention is not limited to these examples.

Example 1

100 parts by mass of "XR31-B1410" (product name, manufactured by Momentive Performance Material Japan G.K.) used as a silane oligomer, 50 parts by mass of tetraethoxysilane "KBE-04" (product name, manufactured by Shin-Etsu Chemical Co., Ltd., hereinafter abbreviated as "TEOS") used as a silane monomer, 300 parts by mass of 2-propanol and 100 parts by mass of water were mixed, and to the resultant, 0.1 parts by mass of acetic acid used as an acid catalyst was added, and the resultant was reacted at 25° C. for 4 hours to obtain a sol. To the thus obtained sol, 80 parts by mass of ammonia water having a concentration of 5% used as a basic catalyst was added, followed by gelation performed at 60° C. for 1 hour, and then the resultant was aged at 60° C. for 48 hours to obtain a wet gel. Thereafter, the thus obtained wet gel was dried under normal pressure at 25° C. for 72 hours, then at 150° C. for 2 hours, and thus, an aerogel was obtained.

Example 2

An aerogel was produced in the same manner as in Example 1 except that "SR-2402" (product name, manufactured by Toray Dow Corning Silicone Co., Ltd.) was used as a silane oligomer.

Example 3

An aerogel was produced in the same manner as in Example 1 except that "AY42-163" (product name, manufactured by Toray Dow Corning Silicone Co., Ltd.) was used as a silane oligomer.

Example 4

100 parts by mass of "KC-89S" (product name, manufactured by Sin-Etsu Chemical Co., Ltd.) used as a silane oligomer, 200 parts by mass of 2-propanol and 50 parts by mass of water were mixed, and to the resultant, 0.15 parts by mass of acetic acid used as an acid catalyst was added, and the resultant was reacted at 25° C. for 4 hours to obtain a sol. To the thus obtained sol, 60 parts by mass of ammonia water having a concentration of 5% used as a basic catalyst was added, followed by gelation performed at 60° C. for 1 hour, and then the resultant was aged at 60° C. for 48 hours to obtain a wet gel. Thereafter, similar procedures to those of Example 1 were performed to produce an aerogel.

Example 5

100 parts by mass of "KR-500" (product name, manufactured by Shin-Etsu Chemical Co., Ltd.) used as a silane oligomer, 100 parts by mass of tetraethoxysilane "KBE-04" (product name, manufactured by Shin-Etsu Chemical Co., Ltd., hereinafter abbreviated as "TEOS") used as a silane monomer, 250 parts by mass of 2-propanol and 80 parts by mass of water were mixed, and to the resultant, 0.15 parts by mass of acetic acid used as an acid catalyst was added, and the resultant was reacted at 25° C. for 4 hours to obtain a sol. To the thus obtained sol, 90 parts by mass of ammonia water having a concentration of 5% used as a basic catalyst was added, followed by gelation performed at 60° C. for 1 hour, and then the resultant was aged at 60° C. for 48 hours to obtain a wet gel. Thereafter, similar procedures to those of Example 1 were performed to produce an aerogel.

Example 6

100 parts by mass of "KR-515" (product name, manufactured by Shin-Etsu Chemical Co., Ltd.) used as a silane oligomer, 20 parts by mass of tetraethoxysilane "KBE-04" (product name, manufactured by Shin-Etsu Chemical Co., Ltd., hereinafter abbreviated as "TEOS") and 20 parts by mass of dimethyldiethoxysilane "KBE-22" (product name, manufactured by Shin-Etsu Chemical Co., Ltd., hereinafter abbreviated as "DMDES") used as silane monomers, 300 parts by mass of 2-propanol and 80 parts by mass of water were mixed, and to the resultant, 0.12 parts by mass of acetic acid used as an acid catalyst was added, and the resultant was reacted at 25° C. for 4 hours to obtain a sol. To the thus obtained sol, 90 parts by mass of ammonia water having a concentration of 5% used as a basic catalyst was added, followed by gelation performed at 60° C. for 1 hour, and then the resultant was aged at 60° C. for 48 hours to obtain a wet gel. Thereafter, similar procedures to those of Example 1 were performed to produce an aerogel.

Example 7

100 parts by mass of "XR31-B1410" (product name, manufactured by Momentive Performance Material Japan G.K.) used as a silane oligomer, 70 parts by mass of dimethyldiethoxysilane "KBE-22" (product name, manufactured by Shin-Etsu Chemical Co., Ltd., hereinafter abbreviated as "DMDES"), 300 parts by mass of 2-propanol and 80 parts by mass of water were mixed, and to the resultant, 0.1 parts by mass of acetic acid used as an acid catalyst was added, and the resultant was reacted at 25° C. for 4 hours to obtain a sol. To the thus obtained sol, 80 parts by mass of ammonia water having a concentration of 5% used as a basic catalyst was added, followed by gelation performed at 60° C. for 1 hour, and then the resultant was aged at 60° C. for 48 hours to obtain a wet gel. Thereafter, similar procedures to those of Example 1 were performed to produce an aerogel.

Example 8

100 parts by mass of "XR31-B1410" (product name, manufactured by Momentive Performance Material Japan G.K.) used as a silane oligomer, 200 parts by mass of methyltrimethoxysilane "KBM-13" (product name, manufactured by Shin-Etsu Chemical Co., Ltd., hereinafter abbreviated as "MTMS") and 50 parts by mass of tetraethoxysilane "KBE-04" (product name, manufactured by Shin-Etsu Chemical Co., Ltd., hereinafter abbreviated as "TEOS") used as silane monomers, 800 parts by mass of 2-propanol and 200 parts by mass of water were mixed, and to the resultant, 0.5 parts by mass of acetic acid used as an acid catalyst was added, and the resultant was reacted at 25° C. for 4 hours to obtain a sol. To the thus obtained sol, 200 parts by mass of ammonia water having a concentration of 5% used as a basic catalyst was added, followed by gelation performed at 60° C. for 1 hour, and then the resultant was aged at 60° C. for 48 hours to obtain a wet gel. Thereafter, similar procedures to those of Example 1 were performed to produce an aerogel.

Comparative Example 1

An aerogel was produced in the same manner as in Example 1 except that methyltrimethoxysilane "KBM-13" (product name, manufactured by Shin-Etsu Chemical Co., Ltd., hereinafter abbreviated as "MTMS") of a silane monomer was used instead of the silane oligomer.

Comparative Example 2

An aerogel was produced in the same manner as in Example 1 except that the silane oligomer was replaced with "Methyl Silicate 51" (silane oligomer containing no T-unit but containing the Q-unit alone, product name, manufactured by Colcoat Co., Ltd.).

[Various Evaluations]

The aerogel obtained in each of the examples and comparative examples was subjected to appearance observation, measurement of a volume shrinkage percentage, measurement of a density and measurement of thermal conductivity under the following conditions for evaluation. The results of evaluation are shown in Table 1.

(1) Evaluation of Appearance

In the obtained aerogels, one retaining a similar shape to that of the wet gel was evaluated as "A", and one not retaining the shape due to a crack or the like was evaluated as "C".

(2) Volume Shrinkage Percentage

In each of the obtained aerogels, a volume shrinkage percentage was calculated in accordance with the following expression. One having a volume shrinkage percentage less than 20% was evaluated as "A", and one having a volume shrinkage percentage of 20% or more was evaluated as "C".

Volume Shrinkage Percentage [%]=[(Volume of dry gel)/(Volume of wet gel)]×100

(3) Density

A density of each of the aerogels was measured in accordance with a water displacement method using an electronic densimeter (product name: SD-200L, manufactured by Alfa Mirage Co., Ltd.).

(4) Measurement of Thermal Conductivity

Each of the aerogels was processed, using a blade having a knife angle of about 20 to 25 degrees, into a size of 150×150×100 mm³ to obtain a measurement sample. Next, in order to ensure parallel of surfaces, the shape of the sample was adjusted using #1500 or finer sandpaper if necessary. The thus obtained measurement sample was dried, before the measurement of thermal conductivity, by using a convection oven "DVS402" (product name, manufactured by Yamato Scientific Co., Ltd.) under atmospheric pressure at 100° C. for 30 minutes. Then, the measurement sample was transferred into a desiccator, and cooled to 25° C.

The measurement of thermal conductivity was performed using a steady method thermal conductivity measuring apparatus "HFM436 Lambda" (product name, manufactured by NETZSCH). The measurement was performed under conditions of atmospheric pressure and an average temperature of 25° C. The measurement sample obtained as described above was disposed between upper and lower heaters under a load of 0.3 MPa, a temperature difference ΔT was set to 20° C., and an upper surface temperature, a lower surface temperature and the like of the measurement sample were measured with a guard heater used for adjustment to obtain one-dimensional heat flow. Then, thermal resistance RS of the measurement sample was obtained in accordance with the following expression:

$$R_S = N((T_U - T_L)/Q) - R_O$$

In the expression, $T_U$ represents the upper surface temperature of the measurement sample, $T_L$ represents the lower surface temperature of the measurement sample, $R_O$ represents thermal contact resistance on an interface between the upper and lower surfaces, and Q represents a heat flux meter output. It is noted that N is a proportionality factor, and was precedently obtained by using a calibration sample.

On the basis of the thus obtained thermal resistance $R_S$, the thermal conductivity λ of the measurement sample was obtained in accordance with the following expression:

$$\lambda = d/R_S$$

In the expression, d represents a thickness of the measurement sample.

TABLE 1

| | Appearance | Volume Shrinkage | Density [g/cm³] | Thermal Conductivity [W/(m·K)] |
|---|---|---|---|---|
| Example 1 | A | A (13.1%) | 0.17 | 0.014 |
| Example 2 | A | A (6.6%) | 0.16 | 0.013 |
| Example 3 | A | A (14.6%) | 0.17 | 0.025 |
| Example 4 | A | A (18.6%) | 0.20 | 0.017 |
| Example 5 | A | A (13.5%) | 0.18 | 0.016 |
| Example 6 | A | A (6.2%) | 0.20 | 0.021 |
| Example 7 | A | A (18.0%) | 0.24 | 0.028 |
| Example 8 | A | A (8.1%) | 0.13 | 0.012 |
| Comparative Example 1 | C | C | 0.72 | — |
| Comparative Example 2 | C | C | 0.85 | — |

In each of Comparative Examples 1 and 2, the volume shrinkage of the wet gel caused in drying was large, and hence the shape of the wet gel before the drying was spoiled, resulting in causing a crack or the like. On the contrary, in each of the examples, the volume shrinkage of the wet gel caused in drying was sufficiently suppressed, and hence an aerogel having a good appearance based on the shape of the wet gel before the drying was obtained. Besides, it was confirmed that the aerogel of each example had a low density, had low thermal conductivity and is excellent in thermal insulation.

The invention claimed is:

1. A method for producing an aerogel, comprising:
a sol generating step of generating, by hydrolyzing a silane oligomer with an acid catalyst, a sol containing a hydrolysis product of the silane oligomer;
a wet gel generating step of obtaining a wet gel by gelation of the sol with a base catalyst; and
a drying step of drying the wet gel to obtain an aerogel,
wherein a proportion of silicon atoms each bonded to three oxygen atoms in a total number of silicon atoms contained in the silane oligomer is 70% or more,
the silane oligomer has an alkoxy group, and
a content of the alkoxy group is 2% by mass or more and 60% by mass or less with respect to a total amount of the silane oligomer.

2. The production method according to claim 1, wherein a weight average molecular weight of the silane oligomer is 200 or more and 10000 or less.

3. An aerogel obtained as a dried substance of a wet gel, the wet gel being a condensate of a sol containing an acid catalyzed hydrolysis product of a silane oligomer,
wherein a proportion of silicon atoms each bonded to three oxygen atoms in a total number of silicon atoms contained in the silane oligomer is 70% or more,
the silane oligomer has an alkoxy group, and
a content of the alkoxy group is 2% by mass or more and 60% by mass or less with respect to a total amount of the silane oligomer.

4. The aerogel according to claim 3, wherein a weight average molecular weight of the silane oligomer is 200 or more and 10000 or less.

5. The production method according to claim 1, wherein the silane oligomer is present in an amount of 5% by mass or more relative to all silicon compounds to be hydrolyzed during the sol generating step.

6. The production method according to claim 1, wherein the sol generating step further comprises hydrolyzing a silane monomer, and an amount of the silane monomer ranges from 1 part by mass to 5000 parts by mass with respect to 100 parts by mass of the silane oligomer.

7. A method for producing an aerogel, comprising: hydrolyzing a silane oligomer in the presence of an acid catalyst to obtain a sol, a proportion of silicon atoms each bonded to three oxygen atoms in a total number of silicon atoms contained in the silane oligomer being 70% or more, the silane oligomer having an alkoxy group, and a content of the alkoxy group being 2% by mass or more and 60% by mass or less with respect to a total amount of the silane oligomer; gelling the sol in the presence of a base catalyst to obtain a wet gel; and drying the wet gel to obtain an aerogel.

* * * * *